United States Patent
Yamaguchi

(10) Patent No.: US 9,227,696 B2
(45) Date of Patent: Jan. 5, 2016

(54) BICYCLE DERAILLEUR

(71) Applicant: Shimano Inc., Sakai, Osaka (JP)

(72) Inventor: Sota Yamaguchi, Osaka (JP)

(73) Assignee: Shimano Inc., Osaka (JP)

( * ) Notice: Subject to any disclaimer, the term of this patent is extended or adjusted under 35 U.S.C. 154(b) by 327 days.

(21) Appl. No.: 13/952,461

(22) Filed: Jul. 26, 2013

(65) Prior Publication Data

US 2015/0031483 A1    Jan. 29, 2015

(51) Int. Cl.
*B62M 9/1242* (2010.01)
*B62M 9/126* (2010.01)

(52) U.S. Cl.
CPC .............. *B62M 9/1242* (2013.01); *B62M 9/126* (2013.01)

(58) Field of Classification Search
CPC ... B62M 9/126; B62M 9/1242; B62M 9/1246
USPC .............. 474/109, 110, 111, 140, 80, 82
See application file for complete search history.

(56) References Cited

U.S. PATENT DOCUMENTS

| | | | | |
|---|---|---|---|---|
| 2,724,976 A * | 11/1955 | Cartlidge | ................... | F16H 7/06 474/111 |
| 3,583,249 A * | 6/1971 | Morse | ..................... | B62M 9/126 474/80 |
| 4,061,048 A * | 12/1977 | Huret | ..................... | B62M 9/126 474/82 |
| 4,637,808 A * | 1/1987 | Nakamura | ............... | B62M 9/16 474/80 |
| 6,793,598 B1 * | 9/2004 | Savard | ................. | B62M 9/1248 474/80 |
| 7,674,198 B2 | 3/2010 | Yamaguchi | | |
| 2007/0026985 A1 * | 2/2007 | Yamaguchi | .......... | B62M 9/1242 474/82 |
| 2008/0064545 A1 * | 3/2008 | Yamaguchi | .............. | B62M 9/16 474/82 |
| 2009/0062045 A1 * | 3/2009 | Kunisawa | .............. | B62M 9/126 474/82 |
| 2014/0057749 A1 * | 2/2014 | Konno | ....................... | F16H 7/18 474/111 |
| 2014/0162821 A1 * | 6/2014 | Braedt | ..................... | F16H 55/30 474/155 |
| 2015/0024889 A1 * | 1/2015 | Konno | ....................... | F16H 7/18 474/111 |

* cited by examiner

*Primary Examiner* — William E Dondero
*Assistant Examiner* — Robert T Reese
(74) *Attorney, Agent, or Firm* — Global IP Counselors

(57) ABSTRACT

A bicycle derailleur is basically provided with a main body, a chain cage, a first pulley, a second pulley and a chain contact member. The main body is configured to be mounted to a bicycle. The chain cage is pivotally coupled to the main body movement between at least a first orientation and a second orientation. The first pulley is rotatably coupled to one of the chain cage and the main body. The second pulley is rotatably mounted to the chain cage to move therewith relative to the main body. The chain contact member is coupled to the main body. The chain contact member includes a non-rotatable chain contact portion that projects into a chain path between the first and second pulleys while the chain cage is in the first orientation, and that is located outside of the chain path between the first and second pulleys while the chain cage is in the second orientation.

14 Claims, 15 Drawing Sheets

BICYCLE DERAILLEUR

BACKGROUND

1. Field of the Invention

This invention generally relates to a bicycle derailleur. More specifically, the present invention relates to a bicycle derailleur that includes a chain cage with at least one pulley rotatably mounted to the chain cage.

2. Background Information

A bicycle typically uses a chain drive transmission for transmitting a pedaling force to a rear wheel. The chain drive transmission of a bicycle often uses derailleurs to selectively move a chain from one of a plurality of sprockets to another fir changing speeds of the bicycle. A typical derailleur has a base member, a movable member supporting a chain guide and a linkage assembly (e.g., a moving mechanism) coupled between the base member and the movable member so that the chain cage moves laterally relative to the base member. In the case of a rear derailleur, typically two pulleys are provided such that as the chain cage and the pulleys compensate for the chain being shifted to change a gear ratio.

SUMMARY

One aspect is to provide a bicycle derailleur that is relatively compact as compared to similar conventional derailleurs.

In view of the state of the known technology and in accordance with a first aspect of the present disclosure, a bicycle derailleur is provided that basically comprises a main body, a chain cage, a first pulley, a second pulley and a chain contact member. The main body is configured to be mounted to a bicycle. The chain cage is pivotally coupled to the main body for movement between at least a first orientation and a second orientation. The first pulley is rotatably coupled to one of the chain cage and the main body. The second pulley is rotatably mounted to the chain cage to move therewith relative to the main body. The chain contact member is coupled to the main body. The chain contact member includes a non-rotatable chain contact portion that projects into a chain path between the first and second pulleys while the chain cage is in the first orientation, and that is located outside of the chain path between the first and second pulleys while the chain cage is in the second orientation.

By providing the bicycle derailleur with the chain contact member in accordance with the first aspect, the distance between the pulleys can be reduced such that a shorter chain cage can be used. Thus, a bicycle derailleur can be produced that is relatively lightweight as compared to similar conventional derailleurs, but yet still relatively simple.

In accordance with a second aspect of the present invention, the bicycle derailleur according to the first aspect is configured so that the main body includes a base member, a movable member and a moving structure operatively coupled between the base member and the movable member to move the movable member and the chain cage relative to the base member.

In accordance with a third aspect of the present invention, the bicycle derailleur according to the second aspect is configured so that the chain contact member is attached to the movable member as a separate member from the movable member.

In accordance with a fourth aspect of the present invention, the bicycle derailleur according to the third aspect is configured so that the chain contact member is attached on the movable member by a least one screw.

In accordance with a fifth aspect of the present invention, the bicycle derailleur according to the second aspect is configured so that a rotational resistance structure mounted on the movable member and arranged to apply rotational resistance to the movement of the chain cage from the first orientation towards the second orientation.

In accordance with a sixth aspect of the present invention, the bicycle derailleur according to the fifth aspect is configured so that a cover member covering the rotational resistance structure, the cover member being attached to the movable member by at least one screw that attaches the chain contact member is attached to the movable member.

In accordance with a seventh aspect of the present invention, the bicycle derailleur according to the second aspect is configured so that the chain contact member and the movable member are made by one-piece member.

In accordance with an eighth aspect of the present invention, the bicycle derailleur according to the first aspect is configured so that at least the non-rotatable chain contact portion of the chain contact member is made of a resin.

In accordance with a ninth aspect of the present invention, the bicycle derailleur according to the first aspect is configured so that the chain contact member includes a support portion, and the non-rotatable chain contact portion is detachably and replaceably attached to the support portion.

In accordance with a tenth aspect of the present invention, the bicycle derailleur according to the first aspect is configured so that the non-rotatable chain contact portion has a chain guide surface that curves in a chain traveling direction between the first and second pulleys.

In accordance with an eleventh aspect of the present invention, the bicycle derailleur according to the first aspect is configured so that the non-rotatable chain contact portion has a chain guide surface that has a lateral dimension larger than 5.5 mm in a direction transverse to a chain traveling direction between the first and second pulleys.

In accordance with a twelfth aspect of the present invention, the bicycle derailleur according to the first aspect is configured so that the non-rotatable chain contact portion has a chain guide surface that has a-dimension larger than 10 mm in a chain traveling direction between the first and second pulleys.

In accordance with a thirteenth aspect of the present invention, the bicycle derailleur according to the first aspect is configured so that the first pulley is rotatably mounted on the main body.

In accordance with a fourteenth aspect of the present invention, the bicycle derailleur according to the first aspect is configured so that the first pulley is rotatably mounted on the chain cage.

Also other objects, features, aspects and advantages of the disclosed bicycle derailleur will become apparent to those skilled in the art from the following detailed description, which, taken in conjunction with the annexed drawings, discloses one embodiment of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
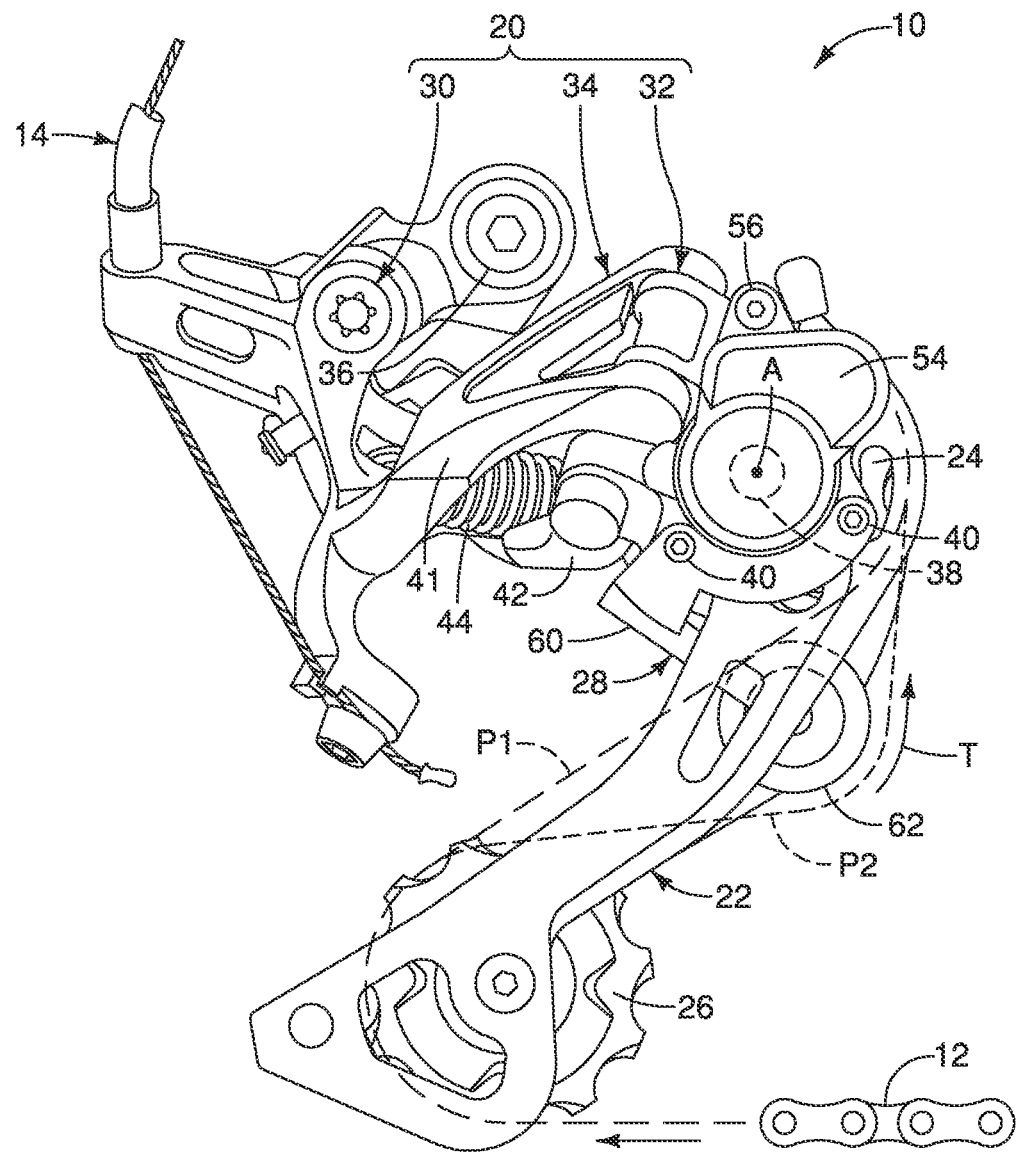
FIG. 1 is a side elevational view of a bicycle derailleur with a chain cage in a first orientation such that a chain contact member projects into a chain path between first and second pulleys in accordance with a first illustrated embodiment.
Figure 2:
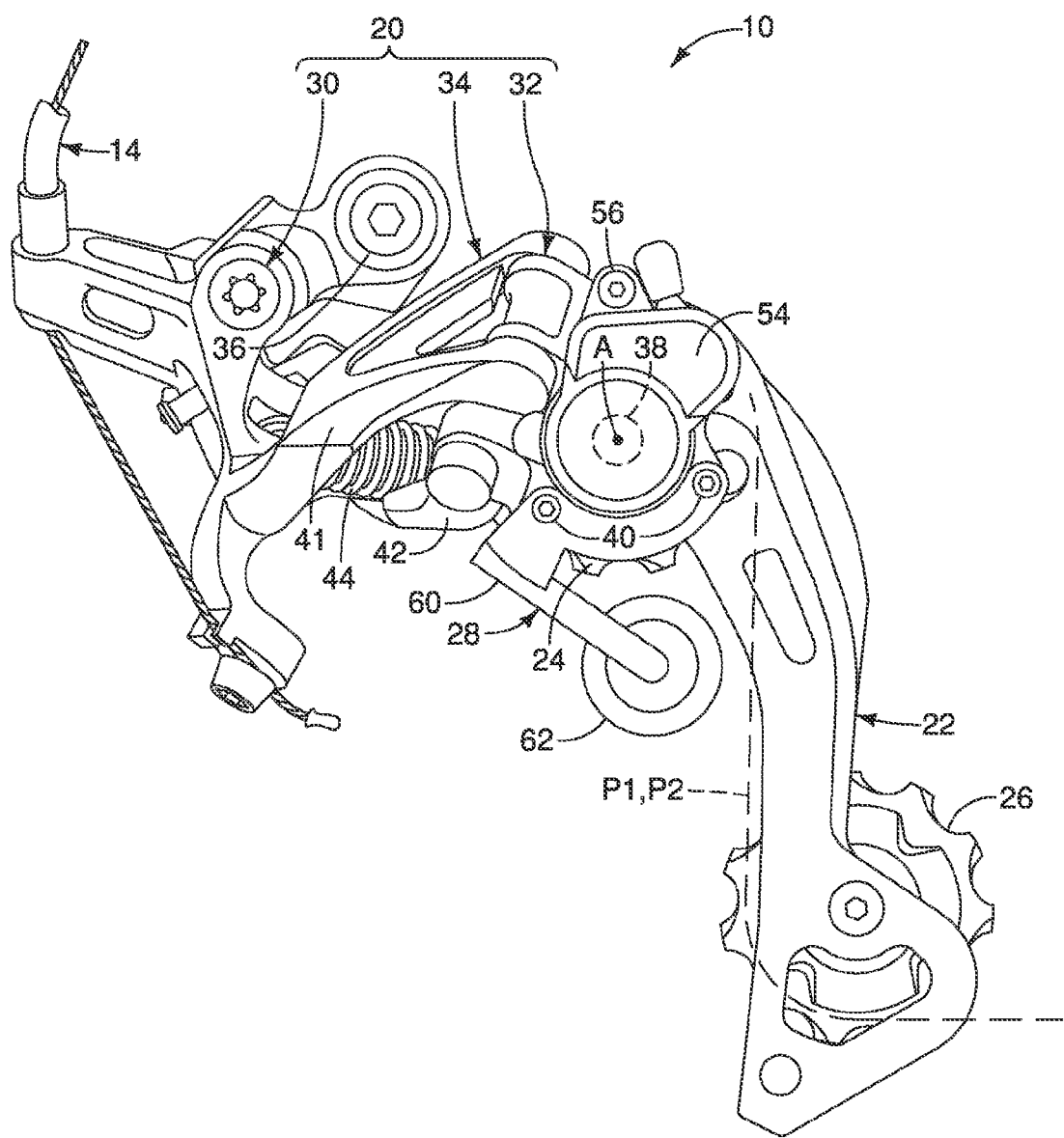
FIG. 2 is a side elevational view of the bicycle derailleur illustrated in FIG. 1 with the chain cage in a second orientation such that the chain contact member is located outside of the chain path between the first and second pulleys.

Referring initially to FIGS. 1 and 2, a bicycle derailleur 10 is illustrated in accordance with a first embodiment. The bicycle derailleur 10 is a rear derailleur that is configured to shift a chain 12 between rear sprockets (not shown) in a conventional manner. In the first embodiment, the bicycle derailleur 10 is operated by a Bowden cable 14. However, the bicycle derailleur 10 is not limited to a cable operated derailleur. In other words, it will be apparent to those skilled in the bicycle field from this disclosure that the bicycle derailleur 10 can include an actuator such a motor, a pneumatic actuator, or the like.

The bicycle derailleur 10 basically comprises a main body 20, a chain cage 22, a first pulley 24, a second pulley 26 and a chain contact member 28. As explained later, the chain contact member 28 is designed to contact the chain 12 to obtain desired chain tensioning characteristics such that the length of the chain cage 22 between the first and second pulleys 24 and 26 can be reduced as compared to conventional derailleurs of the same type. The chain cage 22 pivots relative to the main body 20 about a pivot axis A. The first pulley 24 is rotatably coupled to one of the chain cage 22 and the main body 20. In the first embodiment, as explained below, the first pulley 24 is rotatably mounted on the main body 20 with the pivot axis A of the chain cage 22 being coincident with a center axis of rotation of the first pulley 24. The second pulley 26 is rotatably mounted to the chain cage 22 to move therewith relative to the main body 20. The chain contact member 28 is coupled to the main body 20. As explained later, the chain cage 22 moves relative to the chain contact member 28 as the chain cage 22 pivots relative to the main body 20 about the pivot axis A.

As seen in FIG. 1, the chain 22 travels in a chain traveling direction T between the first and second pulleys 24 and 26 along a first chain path P1 between the first and second pulleys 24 and 26 when the chain contact member 28 is detached. When the chain contact member 28 is installed, the chain 22 moves along a second chain path P2 between the first and second pulleys 24 and 26. As seen in FIG. 1, the second chain path P2 between the first and second pulleys 24 and 26 is longer than the first chain path P1 when the chain contact member 28 contacts the chain 12. In particular, in certain positions of the chain cage 22 (e.g., the chain cage in a top shift stage (gear) position), the chain contact member 28 contacts the chain 12 such that the chain 12 follows the chain path P2 instead of the first chain path P when the chain contact member 28 is removed. Of course, in certain positions of the chain cage 22 (e.g., the chain cage in a low shift stage (gear) position), the chain cage 22 will move the second pulley 26 such that the chain contact member 28 no longer contacts the chain 12. In this case as seen in FIG. 2, the first and second chain paths P1 and P2 become coincident.

As used herein, the term "top shift stage (gear) position" refers to the bicycle derailleur 10 being in a position that corresponds to the chain 12 being guided onto a rear sprocket with the smallest number of teeth. As used herein, the term "low shift stage (gear) position" refers to the bicycle derailleur 10 being in a position that corresponds to the chain 12 being guided onto a rear sprocket with the largest number of teeth The main body 20 is configured to be mounted to a bicycle (not shown). In the first embodiment, the main body 20 includes a base member 30, a movable member 32 and a moving structure 34. The moving structure 34 is operatively coupled between the base member 30 and the movable member 32 to move the movable member 32 and the chain cage 22 relative to the base member 30. The base member 30 defines a first end of the main body 20 that releasably mounted to the bicycle via a fixing bolt 36. The movable member 32 defines a second end of the main body 20 that pivotally supports the chain cage 22 to the main body 20.

Figure 4:
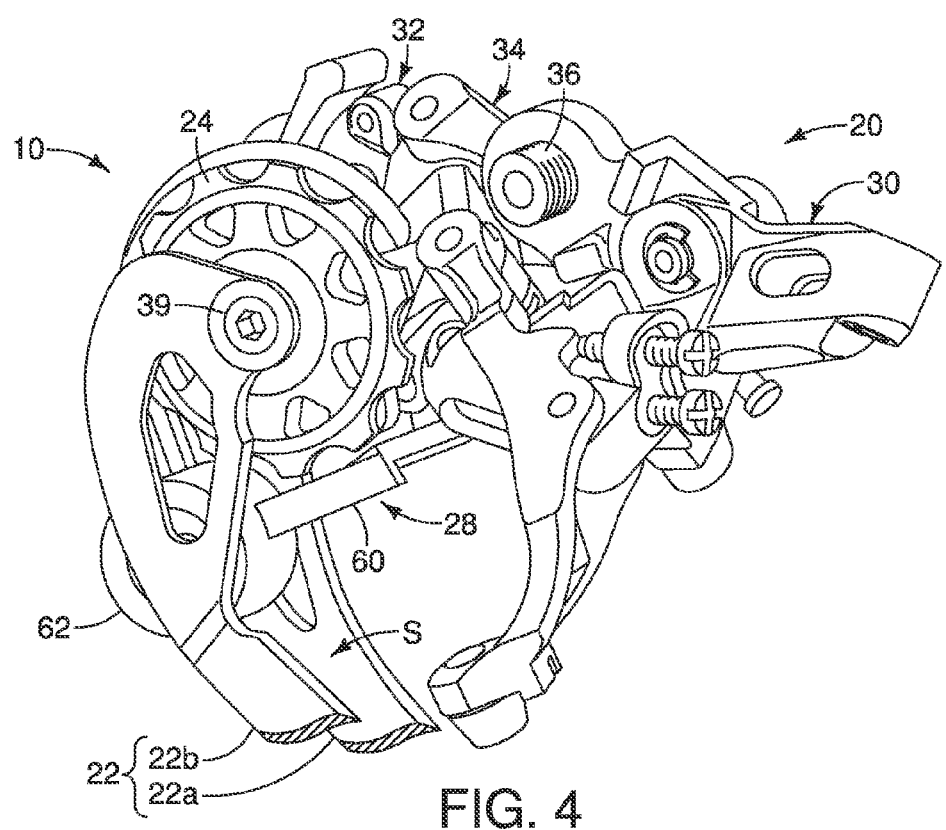
FIG. 4 is another partial perspective view of the bicycle derailleur illustrated in FIGS. 1 and 2 showing chain contact member projecting into the chain cage.

In particular, the chain cage 22 is pivotally coupled to the movable member 32 of the main body 20 by a pivot axle 38 for movement between at least a first orientation (e.g., FIG. 1) and a second orientation (e.g., FIG. 2). Of course, the chain cage 22 can be pivoted to other orientations pivotally than the ones shown in FIGS. 1 and 2. The pivot axle 38 can be fixed to the chain cage 22 or the movable member 32. In the first illustrated embodiment, the pivot axle 38 is preferably a multi-part axle that is non-movably fixed to the chain cage 22, and that is rotatably supported in the movable member 32 in the same manner as discussed in U.S. Patent Application Publication No. 2012/0083371. The first pulley 24 is rotatably attached to the pivot axle 38 by a screw 39 as seen in FIG. 4, and thus, rotatably mounted on the mounted on the movable member 32 of the main body 20 by the pivot axle 38. Thus, the pivot axis A of the chain cage 22 is coincident with a center axis of rotation of the first pulley 24. Also the first illustrated embodiment, the center axis of rotation of the first pulley 24 is fixed with respect to the movable member 32.

Figure 3:
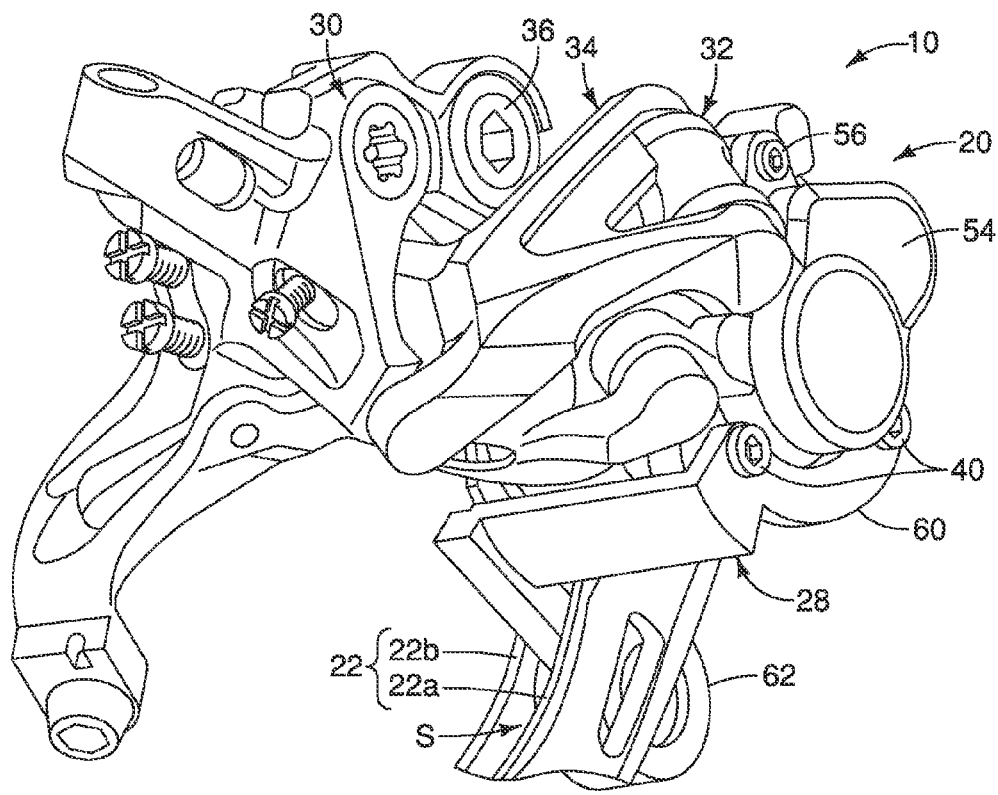
FIG. 3 is a partial perspective view of the bicycle derailleur illustrated in FIGS. 1 and 2 showing the chain contact member projecting into the chain cage.

As seen in FIGS. 3 and 4, the chain contact member 28 is configured and arranged to extend into a chain receiving slot S defined by a pair of chain cage plates 22a and 22b of the chain cage 22. Preferably, the chain contact member 28 does not contact the chain cage plates 22a and 22b as the chain cage 22 pivots relative to the movable member 32 between the first orientation (e.g., FIG. 1) and the second orientation (e.g., FIG. 2). The chain contact member 28 is attached to the movable member 32 as a separate member from the movable member 32. In this particular, in the first embodiment, the chain contact member 28 is attached on the movable member 32 by a least one screw. Here, in the first embodiment, as seen in FIGS. 2 and 3, two screws 40 are used to detachably couple the chain contact member 28 to the movable member 32 of the main body 20 in a reinstallable manner.

In the first embodiment, as seen in FIGS. 1 to 3, the moving structure 34 is a linkage that includes a first or outer link 41 and a second or inner link 42. The outer link 41 has a first end pivotally connected to the base member 30, and a second end pivotally connected to the movable member 32. The inner link 42 has a first end pivotally connected to the base member 30, and a second end pivotally connected to the movable member 32. Thus, the outer and inner links 41 and 42 have first ends pivotally connected to the base member 30 and second ends pivotally connected to the movable member 32 to define a four bar linkage arrangement. The linkage 34 further includes a biasing member 44 that is interposed between the outer and inner links 41 and 42 to bias the movable member 32 towards one of a low shift stage position and a top shift stage position. In the first embodiment, the biasing member 44 is a coil tension spring that biases the movable member 32 towards the top shift stage position.

Figure 5:
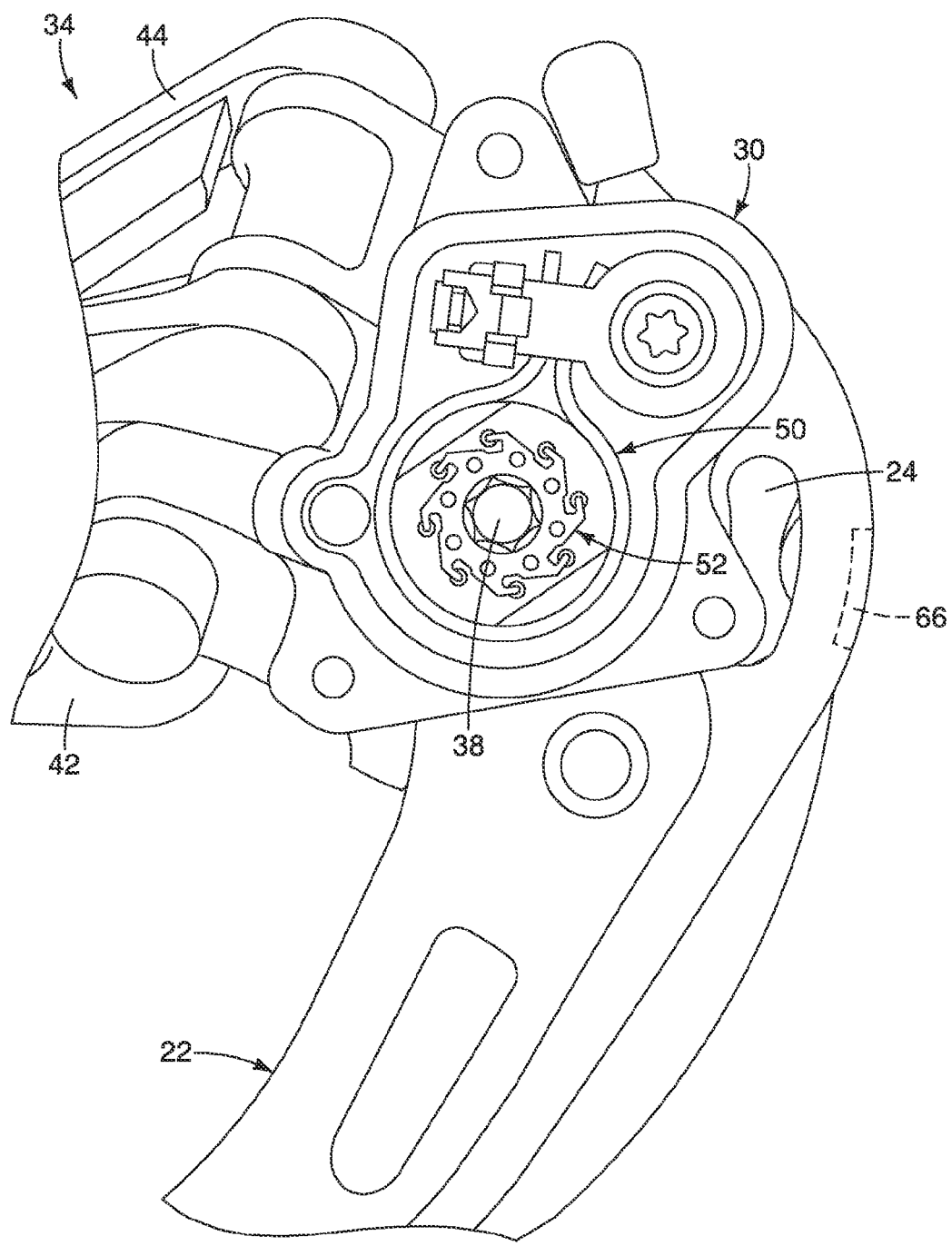
FIG. 5 is a partial side elevational view of the bicycle derailleur illustrated in FIGS. 1 and 2 with a cover member for a rotational resistance structure of the movable member being removed.

In the first embodiment, as seen in FIG. 5, the bicycle derailleur 10 further comprises a rotational resistance structure 50 that is mounted on the movable member 32. The rotational resistance structure 50 is arranged to apply rotational resistance to the movement of the chain cage 22 from the first orientation (FIG. 1) towards the second orientation (FIG. 2). Basically, the rotational resistance structure 50 increases the force needed to pivot the chain cage 22 relative to the movable member 32 from the first orientation towards the second orientation to avoid chain slap. Here, the rotational resistance structure 50 is an adjustable friction band such as disclosed in U.S. Patent Application Publication No. 2012/0083371. Thus, since resistance applying elements and similar to the rotational resistance structure 50 are known in the bicycle field, the rotational resistance structure 50 will not be discussed in further detail herein.

Also in the first embodiment, as seen in FIG. 5, the bicycle derailleur 10 further comprises a one-way clutch 52 that is mounted on the movable member 32. The one-way clutch 52 basically disengages the rotational resistance of the rotational resistance structure 50 from being applied to the pivot axle 38 as the chain cage 22 moves from the second orientation (FIG. 2) towards the first orientation (FIG. 1). In other words, the pivot axle 38 can freely pivot relative to the movable member 32 from the second orientation (FIG. 2) towards the first orientation (FIG. 1) without any frictional resistance from the rotational resistance structure 50. The one-way clutch 52 is discussed in more detail in U.S. Patent Application Publication No. 2012/0083371. Thus, the one-way clutch 52 will not be discussed in further detail herein.

Referring back to FIGS. 1 to 3, the movable member 32 is provided with a cover member 54 that covers the rotational resistance structure 50. Preferably, the cover member 54 is attached to the movable member 32 by at least one of the screws 40 that attaches the chain contact member 28 is attached to the movable member 32. Here, in the first embodiment, the cover member 54 is attached by the screws 40 and one additional screw 56. FIG. 5 illustrates the movable member 32 with the cover member 54 removed.

Figure 6:
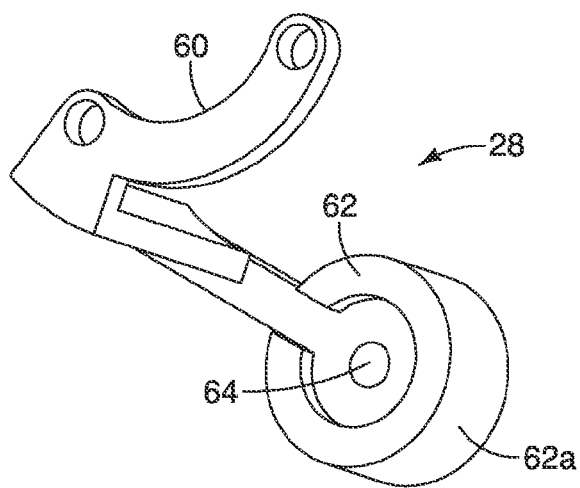
FIG. 6 is a first perspective view of the chain contact member illustrated in FIGS. 1 to 5.
Figure 7:
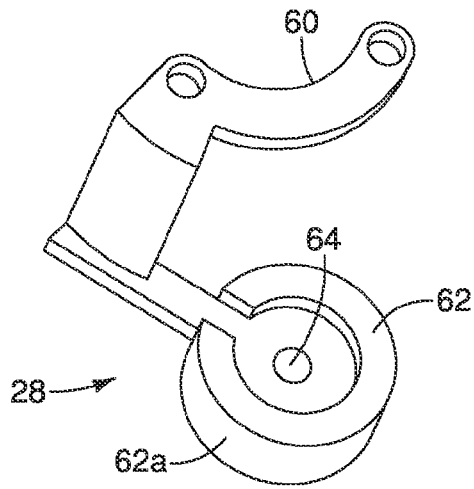
FIG. 7 is a first perspective view of the chain contact member illustrated in FIGS. 1 to 6.
Figure 8:
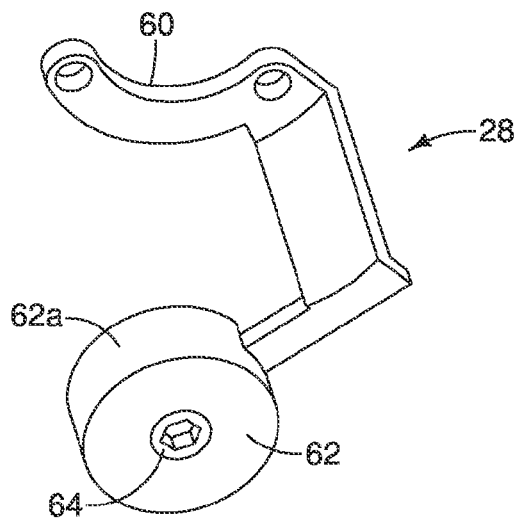
FIG. 8 is a first perspective view of the chain contact member illustrated in FIGS. 1 to 7.

As seen in FIGS. 6 to 8, the chain contact member 28 of the first embodiment is illustrated by itself. Basically, the chain contact member 28 includes a support portion 60 and a non-rotatable chain contact portion 62. The chain contact member 28 is coupled to the main body 20 by the support portion 60 using the screws 40 as seen in FIGS. 1 to 3. The non-rotatable chain contact portion 62 projects into the first chain path P1 between the first and second pulleys 24 and 26, while the chain cage 22 is in the first orientation (FIG. 1), and that is located outside of the first chain path P1 between the first and second pulleys 24 and 26 while the chain cage 22 is in the second orientation (FIG. 2). Thus, the non-rotatable chain contact portion 62 contacts the chain 12 to change the path of the chain 12 from the first chain path P11 to the second chain path P2, while the non-rotatable chain contact portion 62 projects into the first chain path P1.

Preferably, the non-rotatable chain contact portion 62 is detachably and replaceably attached to the support portion 60. Here, the non-rotatable chain contact portion 62 is non-rotatably attached to the support portion 60 by a screw 64. Alternatively, the non-rotatable chain contact portion 62 and the support portion 60 can be made as one-piece member if needed and/or desired. By making the non-rotatable chain contact portion 62 replaceable, the support portion 60 can be made of a strong rigid material such as metal or a fiber-reinforced material, while the non-rotatable chain contact portion 62 is made of a material have a low coefficient of friction. Preferably, the at least the non-rotatable chain contact portion 62 of the chain contact member 28 is made of a resin. In the first embodiment, the non-rotatable chain contact portion 62 is made of a resin, while the support portion 60 is made of a lightweight metal such as aluminum.

Preferably, the non-rotatable chain contact portion 62 has a chain guide surface 62a that curves in the chain traveling direction T between the first and second pulleys 24 and 26. Preferably, the chain guide surface 62 a has a lateral dimension larger than 5.5 mm in a direction transverse to the chain traveling direction T between the first and second pulleys 24 and 26. Also preferably, the chain guide surface 62a has a dimension larger than 10 mm in a chain traveling direction T between the first and second pulleys 24 and 26.

Also in the first embodiment, the chain cage 22 includes a preventing member 66 that prevents the chain 12 from dropping off from the first pulley 24. The preventing member 66 is disposed near the pivot axis A of the chain cage 22 and the first pulley 24. The preventing member 66 does not touch the chain 12 when the chain cage 22 is in any position and the chain 12 is correctly engaged with the first and second pulleys 24 and 26. The preventing member 66 is disposed on an upper side of the chain contact member 28.

Referring now to FIGS. 9 to 12, a bicycle derailleur 110 is illustrated in accordance with a second embodiment. The bicycle derailleur 110 basically comprises a main body 120, a chain cage 122, a first pulley 124, a second pulley 126 and a chain contact member 128. The main body 120 includes a base member 130, a movable member 132 and a moving structure 134. The bicycle derailleur 110 of the second embodiment is identical to the bicycle derailleur 10 of the first embodiment, except that the chain cage 122 and the chain contact member 128 have been modified as explained below. Accordingly, the descriptions of the parts of the bicycle derailleur 110 of the second embodiment that are identical to the parts of the first embodiment have been omitted for the sake of brevity.

Here, in the second embodiment, the first pulley 124 is rotatably mounted on the chain cage 122 such that the pivot axis A of the chain cage 122 is offset from a center rotational axis B of the first pulley 124. Accordingly, the pivot axis A of the chain cage 122, the center rotational axis B of the first pulley 124 and a center rotational axis C of the second pulley 126 form a triangle. The chain cage 122 is pivotally coupled to the movable member 132 of the main body 120 by a pivot axle 138 for movement between at least first and second orientations similar to the first embodiment. However, the first pulley 124 is not mounted to the pivot axle 138. Rather, the first pulley 124 is mounted to the chain cage 122 by a screw 139.

Figure 11:
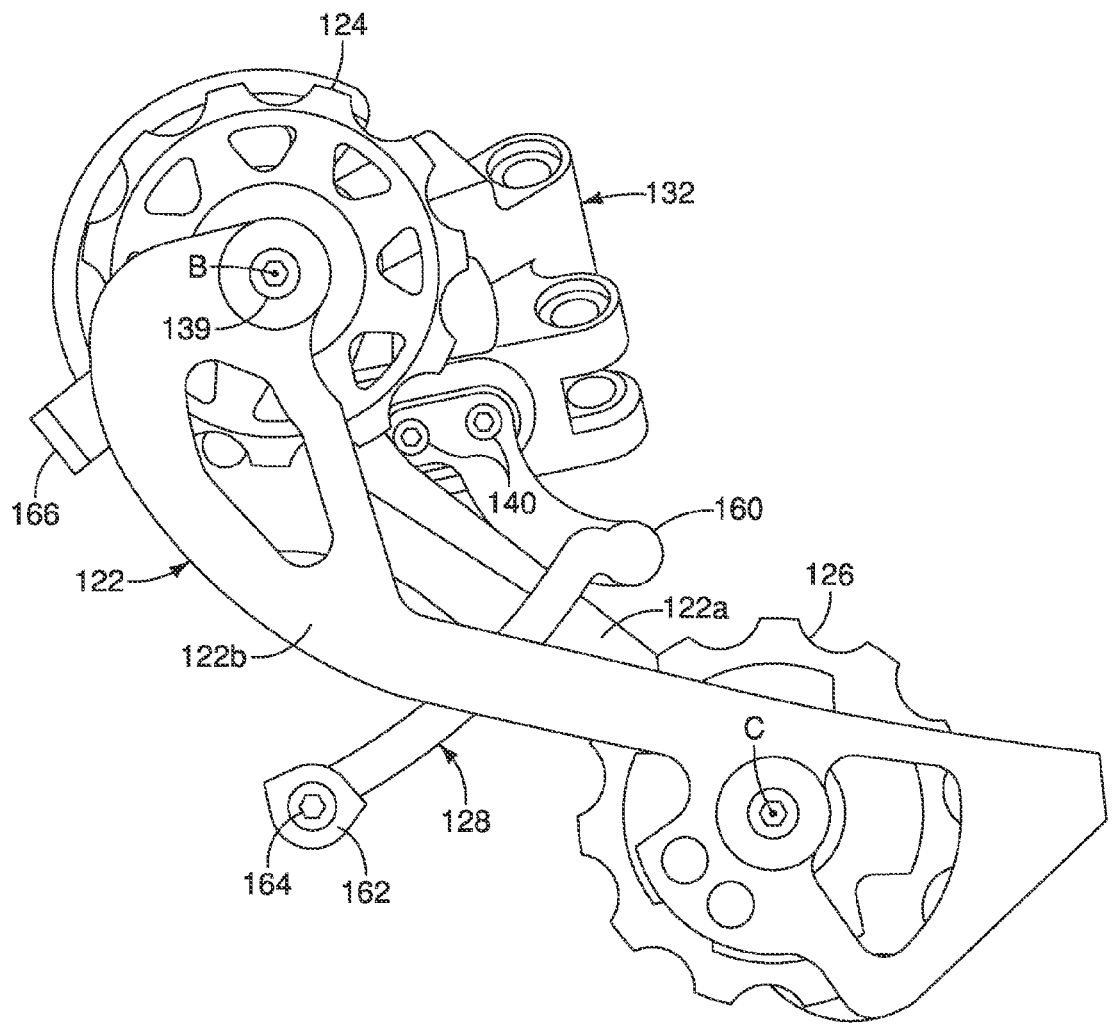
FIG. 11 is a side elevational view of selected parts of the bicycle derailleur illustrated in FIG. 9 showing the chain contact member projecting into the chain cage.

The chain contact member 128 is configured and arranged to extend into the chain receiving slot S defined by a pair of chain cage plates 122a and 122b of the chain cage 122. Here, as seen in FIG. 11, the chain contact member 128 is attached to an inward side of the movable member 132 by a pair of screws 140 in a reinstallable manner.

Figure 12:
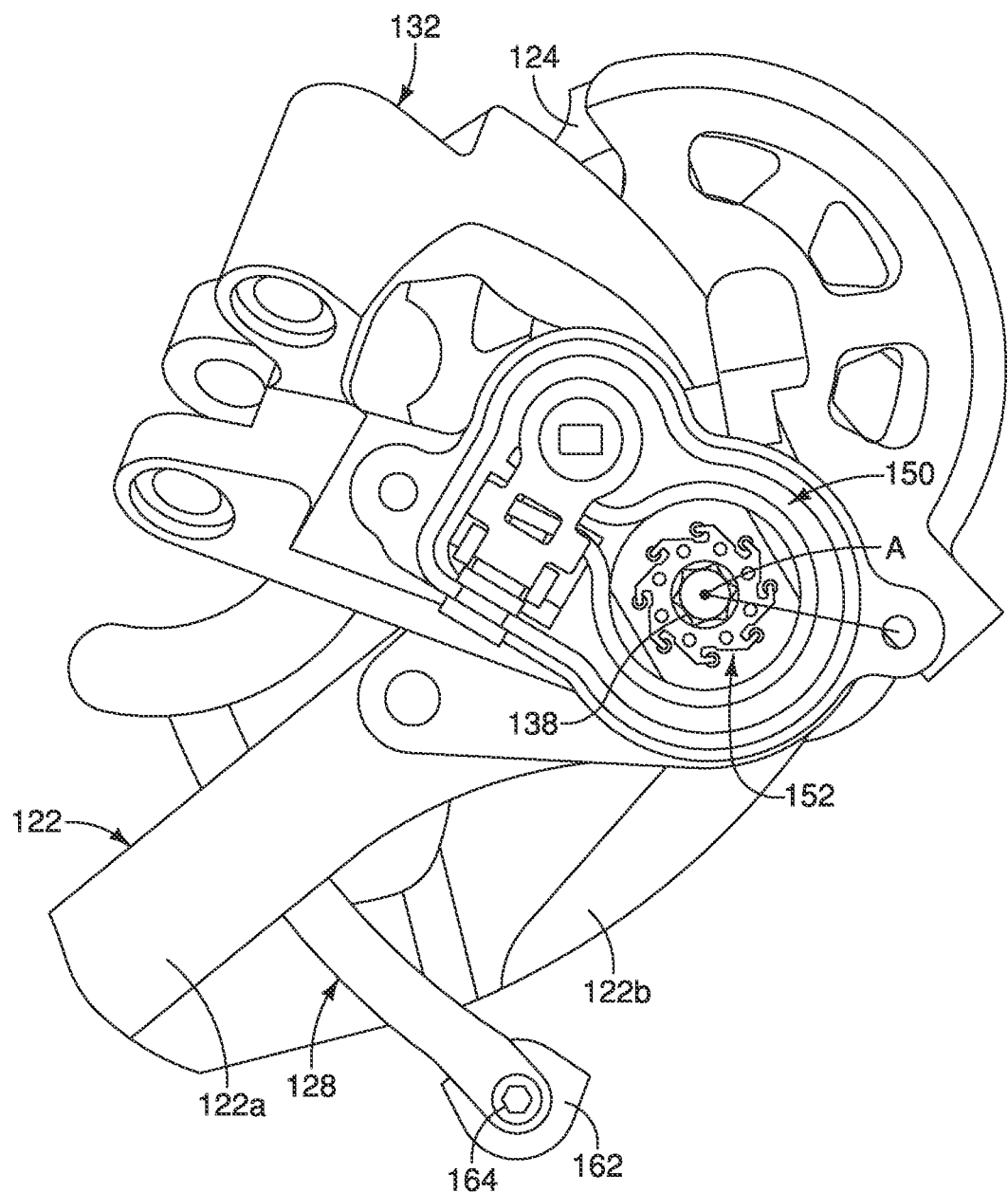
FIG. 12 is a partial side elevational view of the bicycle derailleur illustrated in FIG. 9 with a cover member for a rotational resistance structure of the movable member being removed.

Similar to the first embodiment, as seen in FIG. 12, the bicycle derailleur 110 further comprises a rotational resistance structure 150 and a one-way clutch 152. The rotational resistance structure 150 and the one-way clutch 152 are the same as in the first embodiment except for minor differences that do not affect the way they operate.

Figure 9:
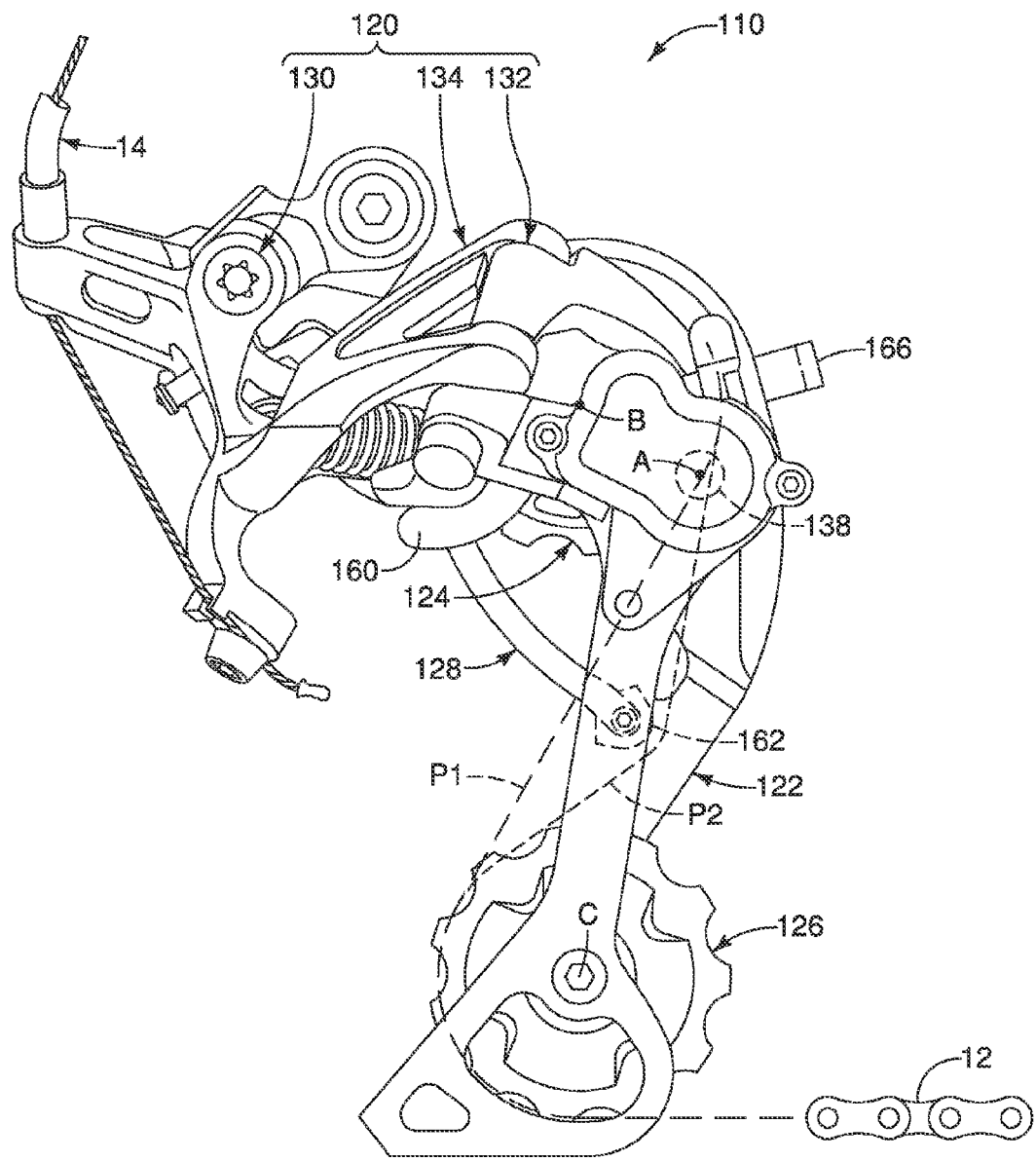
FIG. 9 is a side elevational view of a bicycle derailleur with a chain cage in a first orientation such that a chain contact member projects into a chain path between the first and second pulleys in accordance with a second illustrated embodiment.
Figure 10:
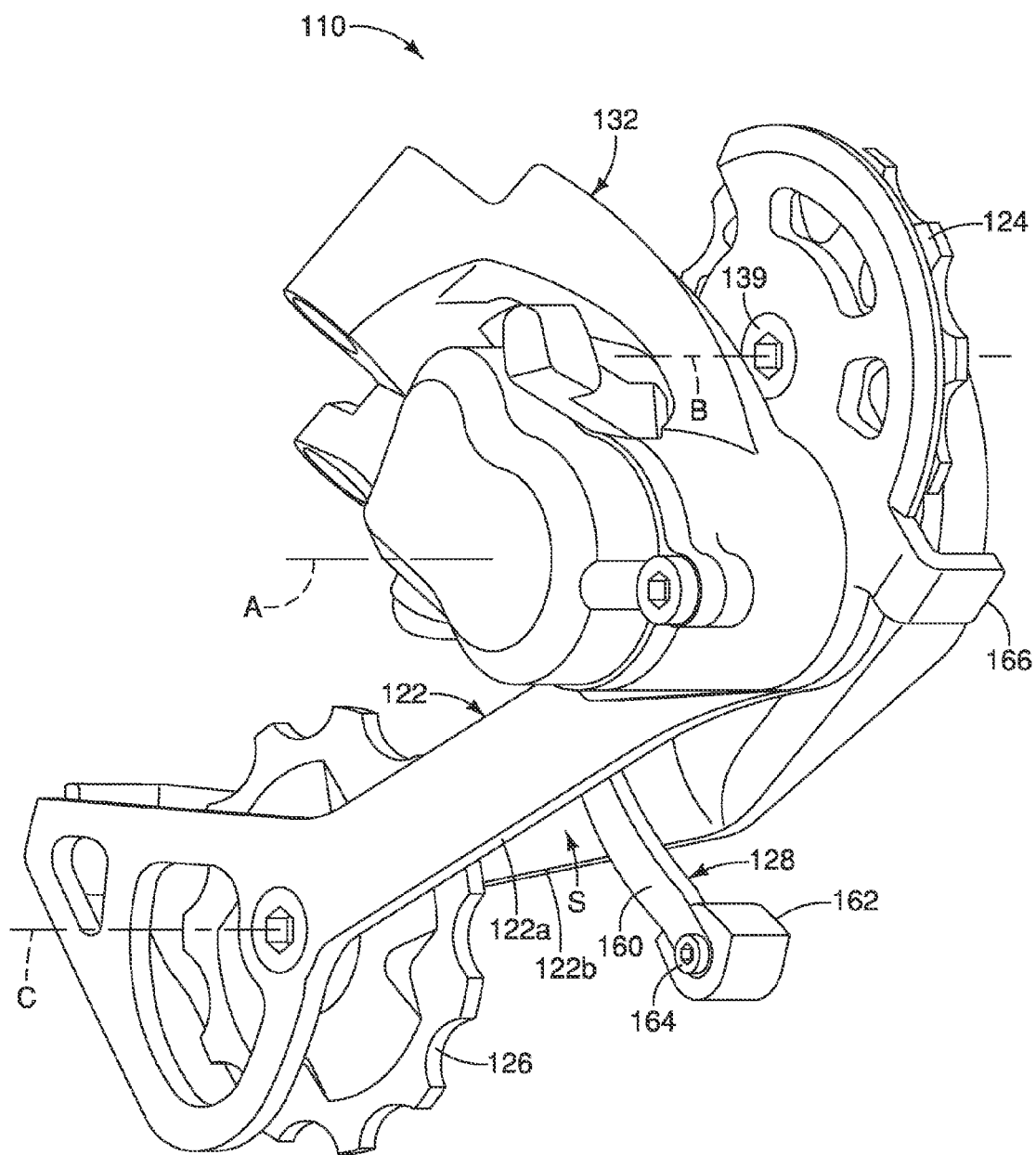
FIG. 10 is a partial perspective view of the bicycle derailleur illustrated in FIG. 9 showing the chain contact member projecting into the chain cage.

Similar to the first embodiment, the chain contact member 128 includes a support portion 160 and a non-rotatable chain contact portion 162. The chain contact member 128 is coupled to the movable member 132 of the main body 120 by the support portion 160 using the screws 140 as seen in FIG. 11. The non-rotatable chain contact portion 162 projects into the first chain path P1 between the first and second pulleys 124 and 126, while the chain cage 122 is in an orientation such as seen in FIG. 9, and that is located outside of the first chain path P1 between the first and second pulleys 124 and 126 while the chain cage 122 is in a second orientation (FIG. 2). Thus, the non-rotatable chain contact portion 162 contacts the chain 12 to change the path of the chain 12 from the first chain path P1 to the second chain path P2, while the non-rotatable chain contact portion 162 projects into the first chain path P1.

Preferably, the non-rotatable chain contact portion 162 is detachably and replaceably attached to the support portion 160. Here, the non-rotatable chain contact portion 162 is non-rotatably attached to the support portion 160 by a screw 164. Alternatively, the non-rotatable chain contact portion 162 and the support portion 160 can be made as one-piece member if needed and/or desired. By making the non-rotatable chain contact portion 162 replaceable, the support portion 160 can be made of a strong rigid material such as metal or a fiber-reinforced material, while the non-rotatable chain contact portion 162 is made of a material have a low coefficient of friction. Preferably, the at least the non-rotatable chain contact portion 162 of the chain contact member 128 is made of a resin. In the second embodiment, the non-rotatable chain contact portion 162 is made of a resin, while the support portion 160 is made of a lightweight metal such as aluminum.

Also in the second embodiment, the chain cage 122 includes a preventing member 166 that prevents the chain 12 from dropping off from the first pulley 124. The preventing member 166 is disposed near the pivot axis A of the chain cage 122 and the first pulley 124. The preventing member 166 does not touch the chain 12 when the chain cage 122 is in any position and the chain 12 is correctly engaged with the first and second pulleys 124 and 126. The preventing member 166 is disposed on an upper side of the chain contact member 128.

Figure 13:
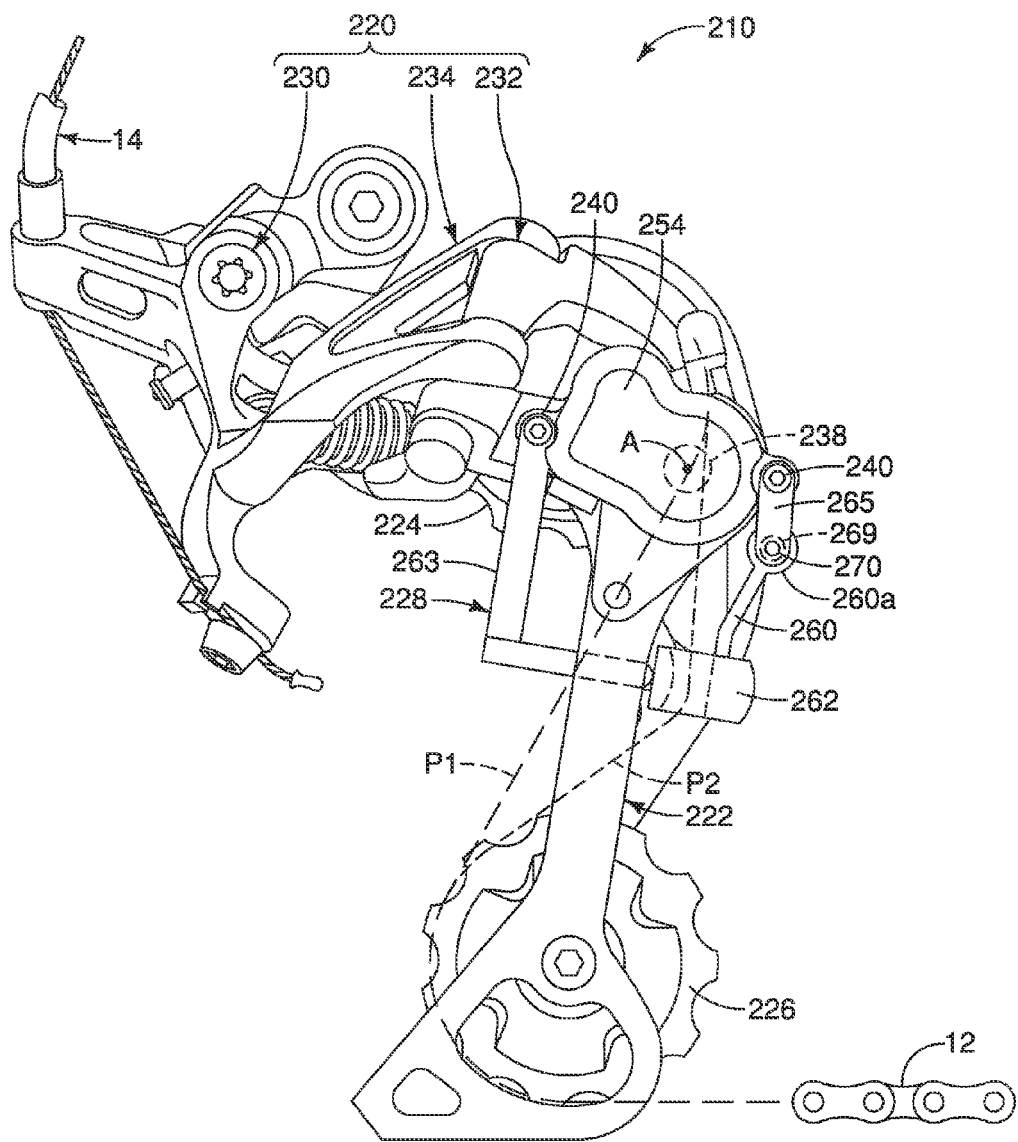
FIG. 13 is a side elevational view of a bicycle derailleur with a chain cage in a first orientation such that a chain contact member projects into a chain path between first and second pulleys in accordance with a third illustrated embodiment.
Figure 14:
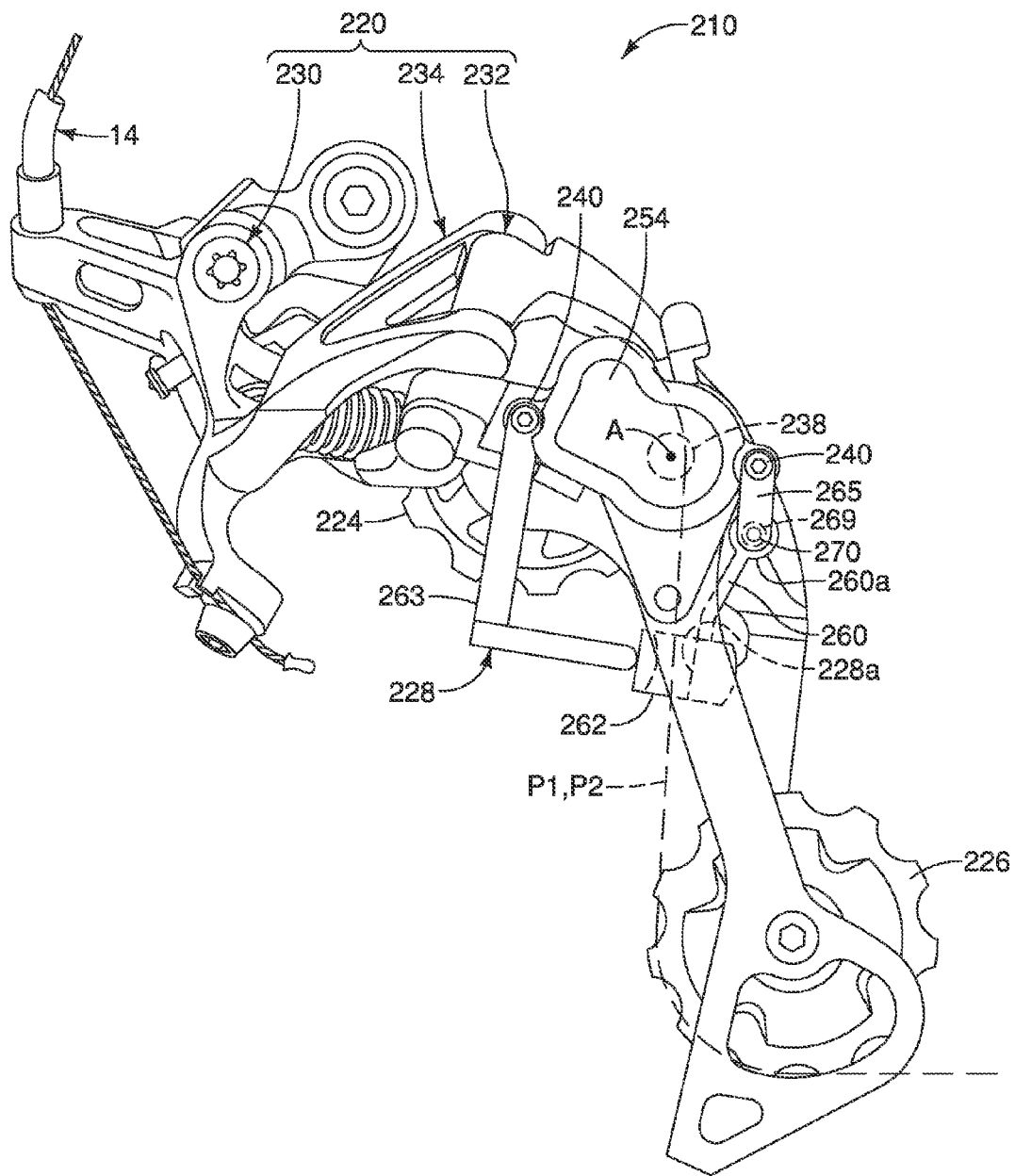
FIG. 14 is a side elevational view of the bicycle derailleur illustrated in FIG. 13 with the chain cage in a second orientation such that the chain contact member is located outside of the chain path between first and second pulleys.
Figure 15:
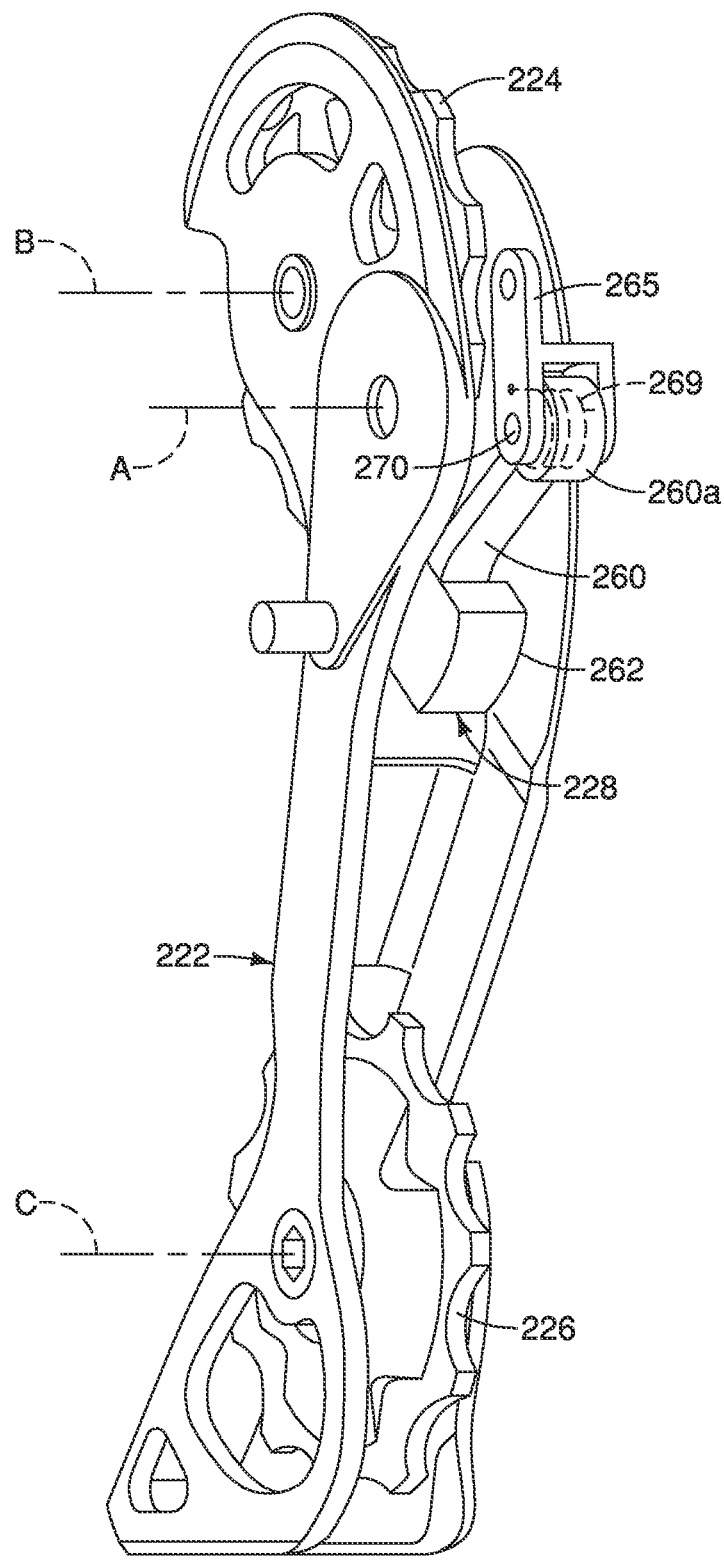
FIG. 15 is a perspective view of selected parts of the bicycle derailleur illustrated in FIGS. 13 and 14 showing the chain contact member projecting into the chain cage.

Referring now to FIGS. 13 to 15, a bicycle derailleur 210 is illustrated in accordance with a third embodiment. The bicycle derailleur 210 basically comprises a main body 220, a chain cage 222, a first pulley 224, a second pulley 226 and a chain contact member 228. The main body 220 includes a base member 230, a movable member 232 and a moving structure 234. The bicycle derailleur 210 of the third embodiment is identical to the bicycle derailleur 110 of the first embodiment, except that the chain cage 222 and the chain contact member 228 have been modified as explained below. Accordingly, the descriptions of the parts of the bicycle derailleur 210 of the third embodiment will be limited to the differences for the sake of brevity.

In the third embodiment, the chain contact member 228 basically includes a support portion 260, a non-rotatable chain contact portion 262 and a positioning portion 263. The support portion 260 and the non-rotatable chain contact portion 262 are integrally formed as a one-piece member that is attached to the movable member 232 by an attachment member 265. The support portion 260 is pivotally mounted to the attachment member 265, which is attached to the movable member 232 by one of two screws 240. As best seen in FIG. 15, a biasing member 269 (e.g., a torsion spring) is provided between the support portion 260 and the attachment member 265 to bias the non-rotatable chain contact portion 262 into contact with the positioning portion 263. The biasing member 269 has a coiled portion disposed on a pivot pin 270, a first end disposed in a hole in the support portion 260, and a second end disposed in a hole in the attachment member 265. The positioning portion 263 is attached to the movable member 232 by one of two screws 240. The screws 240 are also used to attach a cover member 254 that covers the rotational resistance structure and the one-way clutch.

In the embodiment, the support portion 260 has an end 260a that is pivotally attached to the attachment member 265 near the pivot axis A of the chain cage 222 and the first pulley 224 such that the end 260a acts as a preventing member to prevent the chain 12 from dropping off from the first pulley 224. Thus, the chain contacting member 228 and the preventing member (i.e., the end 260a) are made as one-piece member in this third embodiment. The end 260a of the support portion 260 does not touch the chain 12 when the chain cage 222 is in any position and the chain 12 is correctly engaged with the first and second pulleys 224 and 226.

In this third embodiment, the chain contacting member 228 has a slot or through hole 228a for receiving the chain 12 therethrough. As the chain cage 222 pivots about the pivot axis A, the relative position of the chain contacting member 228 changes relative to the chain cage 222 such that the chain 12 follows the second chain path P2 as seen in FIG. 13. Similar to the prior embodiment, the chain 12 does not contact the chain contacting member 228 while the chain cage 222 is in at least one orientation as seen in FIG. 14.

Figure 16:
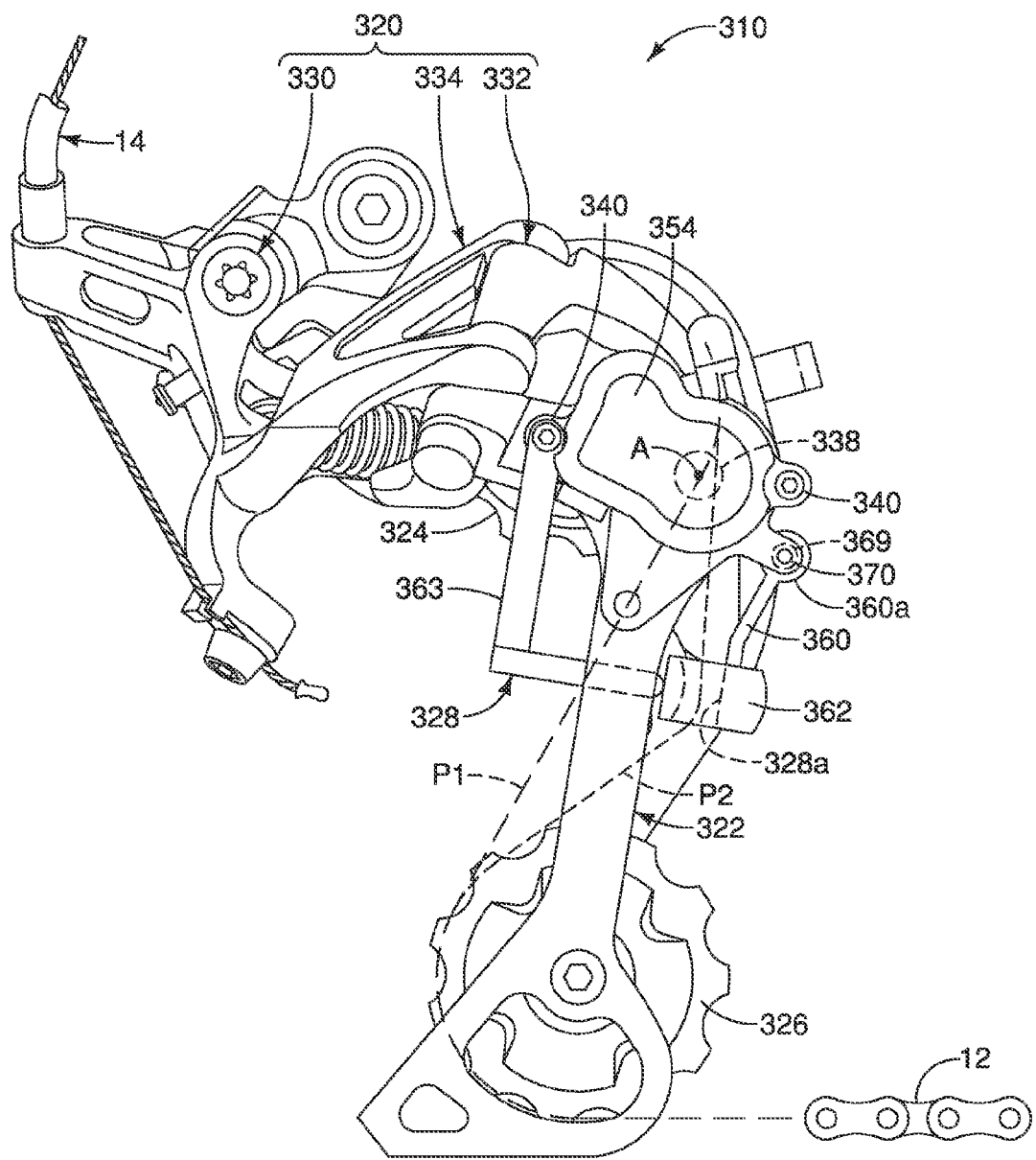
FIG. 16 is a side elevational view of a bicycle derailleur with a chain cage in a first orientation such that a chain contact member projects into a chain path between first and second pulleys in accordance with a fourth illustrated embodiment.

Referring now to FIG. 16, a bicycle derailleur 310 is illustrated in accordance with a fourth embodiment. The bicycle derailleur 310 basically comprises a main body 320, a chain cage 322, a first pulley 324, a second pulley 326 and a chain contact member 328. The main body 320 includes a base member 330, a movable member 332 and a moving structure 334. The bicycle derailleur 310 of the fourth embodiment is identical to the bicycle derailleur 210 of the third embodiment, except that the chain cage 322 and the chain contact member 328 have been modified as explained below. Accordingly, the descriptions of the parts of the bicycle derailleur 310 of the fourth embodiment will be limited to the differences for the sake of brevity.

In the fourth embodiment, the chain contact member 328 basically includes a support portion 360, a non-rotatable chain contact portion 362 and a positioning portion 363. The chain contact member 328 is identical to the chain contact member 228, except that the support portion 360 of the chain contact member 328 is pivotally attached directly to the chain cage 322 by a pivot pin 370. Thus, the chain cage 322 is identical to the chain cage 222, except that the chain cage 322 has been modified so that the pivot pin 370 can be directly fixed to the chain cage 322. Similar to the third embodiment, the support portion 360 has an end 360a that acts as a preventing member to prevent the chain 12 from dropping off from the first pulley 324. Similar to the third embodiment, the non-rotatable chain contact portion 362 of chain contact member 328 has a slot 328a for receiving the chain 12 therethrough.

Figure 17:
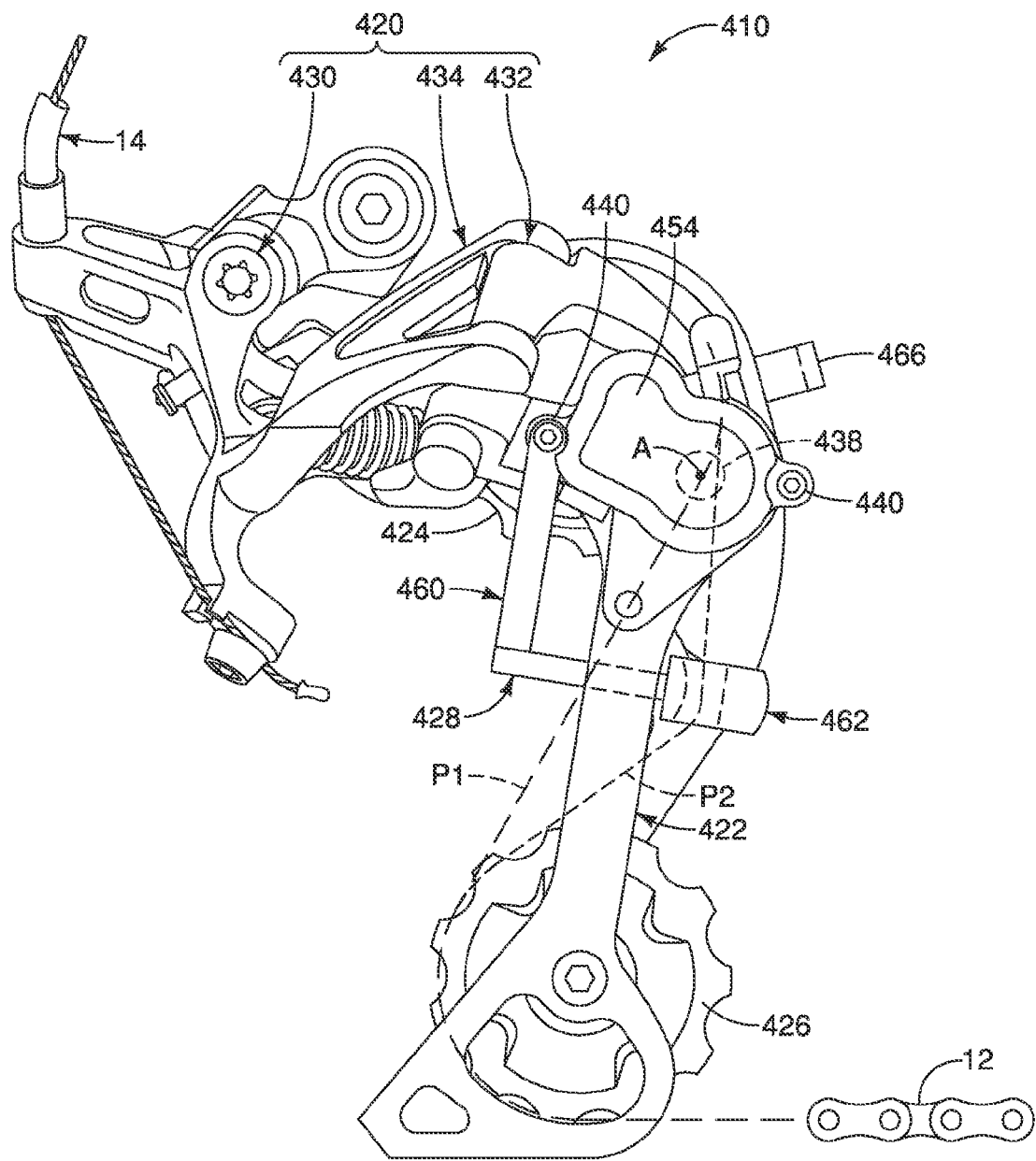
FIG. 17 is a side elevational view of a bicycle derailleur with a chain cage in a first orientation such that a chain contact member projects into a chain path between first and second pulleys in accordance with a fifth illustrated embodiment.

Referring now to FIG. 17, a bicycle derailleur 410 is illustrated in accordance with a fifth embodiment. The bicycle derailleur 410 basically comprises a main body 420, a chain cage 422, a first pulley 424, a second pulley 426 and a chain contact member 428. The main body 420 includes a base member 430, a movable member 432 and a moving structure 434. The bicycle derailleur 410 of the fifth embodiment is identical to the bicycle derailleur 210 of the third embodiment, except that the chain cage 422 and the chain contact member 428 have been modified as explained below. Accordingly, the descriptions of the parts of the bicycle derailleur 410 of the fifth embodiment will be limited to the differences for the sake of brevity.

In the fifth embodiment, the chain contact member 428 basically includes a support portion 460 and a non-rotatable chain contact portion 462. The chain contact member 428 is identical to the chain contact member 228, except that the support portion 460 of the chain contact member 428 is non-pivotally attached directly to the movable member 432 by one of the screws 440. Thus, the chain cage 422 is identical to the chain cage 222, except that the chain cage 422 has been modified to include a preventing member 466 that is arranged to prevent the chain 12 from dropping off from the first pulley 424.

Figure 18:
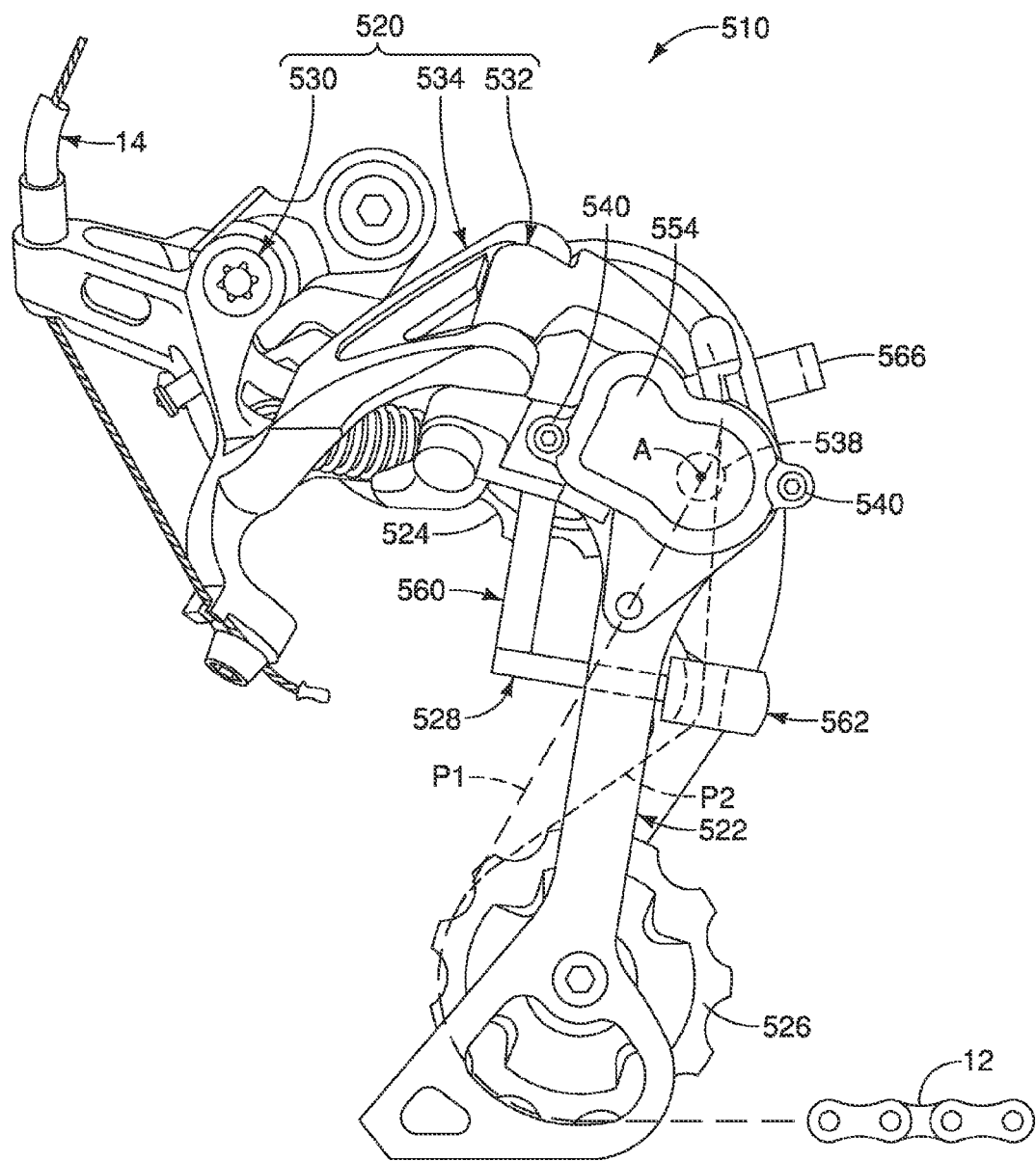
FIG. 18 is a side elevational view of a bicycle derailleur with a chain cage in a first orientation such that a chain contact member projects into a chain path between first and second pulleys in accordance with a sixth illustrated embodiment.

Referring now to FIG. 18, a bicycle derailleur 510 is illustrated in accordance with a sixth embodiment. The bicycle derailleur 510 basically comprises a main body 520, a chain cage 522, a first pulley 524, a second pulley 526 and a chain contact member 528. The main body 520 includes a base member 530, a movable member 532 and a moving structure 534. The bicycle derailleur 510 of the sixth embodiment is identical to the bicycle derailleur 210 of the third embodiment, except that the chain cage 522 and the chain contact member 528 have been modified as explained below. Accordingly, the descriptions of the parts of the bicycle derailleur 510 of the sixth embodiment will be limited to the differences for the sake of brevity.

In the sixth embodiment, the chain contact member 528 basically includes a support portion 560 and a non-rotatable chain contact portion 562. The chain contact member 528 is identical to the chain contact member 428, except that the chain contact member 528 and the movable member 532 are made by one-piece member. The chain cage 522 is identical to the chain cage 222, except that the chain cage 522 has been modified so as to include a preventing member 566 that is arranged to prevent the chain 12 from dropping off from the first pulley 524.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long the result is not significantly changed. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
a main body configured to be mounted to a bicycle;
a chain cage pivotally coupled to the main body for movement between at least a first orientation and a second orientation;
a first pulley rotatably coupled to one of the chain cage and the main body;
a second pulley rotatably mounted to the chain cage to move therewith relative to the main body; and
a chain contact member coupled to the main body, the chain contact member including a non-rotatable chain contact portion that projects into a chain path between the first and second pulleys while the chain cage is in the first orientation and that is located outside of the chain path between the first and second pulleys while the chain cage is in the second orientation.

2. The bicycle derailleur according to claim 1, wherein the main body includes a base member, a movable member and a moving structure operatively coupled between the base member and the movable member to move the movable member and the chain cage relative to the base member.

3. The bicycle derailleur according to claim 2, wherein the chain contact member is attached to the movable member as a separate member from the movable member.

4. The bicycle derailleur according to claim 3, wherein the chain contact member is attached on the movable member by a least one screw.

5. The bicycle derailleur according to claim 2, further comprising
a rotational resistance structure mounted on the movable member and arranged to apply rotational resistance to the movement of the chain cage from the first orientation towards the second orientation.

6. The bicycle derailleur according to claim 5, further comprising
a cover member covering the rotational resistance structure, the cover member being attached to the movable member by at least one screw that attaches the chain contact member is attached to the movable member.

7. The bicycle derailleur according to claim 2, wherein the chain contact member and the movable member are made by one-piece member.

8. The bicycle derailleur according to claim 1, wherein at least the non-rotatable chain contact portion of the chain contact member is made of a resin.

9. The bicycle derailleur according to claim 1, wherein the chain contact member includes a support portion, and the non-rotatable chain contact portion is detachably and replaceably attached to the support portion.

10. The bicycle derailleur according to claim 1, wherein the non-rotatable chain contact portion has a chain guide surface that curves in a chain traveling direction between the first and second pulleys.

11. The bicycle derailleur according to claim 1, wherein the non-rotatable chain contact portion has a chain guide surface that has a lateral dimension larger than 5.5 mm in a direction transverse to a chain traveling direction between the first and second pulleys.

12. The bicycle derailleur according to claim 1, wherein the non-rotatable chain contact portion has a chain guide surface that has a dimension larger than 10 mm in a chain traveling direction between the first and second pulleys.

13. The bicycle derailleur according to claim 1, wherein the first pulley is rotatably mounted on the main body.

14. The bicycle derailleur according to claim 1, wherein the first pulley is rotatably mounted on the chain cage.

\* \* \* \* \*